United States Patent [19]

Mizutani et al.

[11] Patent Number: 5,893,527
[45] Date of Patent: Apr. 13, 1999

[54] SINGLE-REEL TAPE CARTRIDGE

[75] Inventors: Hikaru Mizutani, Mino; Takashi Sumida, Shiga-ken; Nobutaka Miyazaki, Kusatsu, all of Japan

[73] Assignee: Hitachi Maxell, Ltd., Osaka-fu, Japan

[21] Appl. No.: 09/097,160

[22] Filed: Jun. 12, 1998

[30] Foreign Application Priority Data

Jun. 13, 1997 [JP] Japan ..................... 9-172795

[51] Int. Cl.⁶ ..................................... G11B 23/087
[52] U.S. Cl. ................... 242/348; 242/338.1; 242/343.2; 242/345.2
[58] Field of Search ................. 242/338, 338.1, 242/340, 342, 343, 343.2, 345.2, 348; 340/132

[56] References Cited

U.S. PATENT DOCUMENTS

| | | | |
|---|---|---|---|
| 3,706,426 | 12/1972 | Prahl ......................... | 242/343 |
| 4,033,523 | 7/1977 | Roman ........................ | 242/338.1 |
| 4,555,077 | 11/1985 | Platter et al. ................. | 242/338.1 |
| 4,887,775 | 12/1989 | Kanaguchi et al. ............. | 242/342 |
| 5,027,249 | 6/1991 | Johnson et al. ............... | 242/345.2 |
| 5,209,424 | 5/1993 | Fischer et al. ................. | 242/348 |
| 5,366,173 | 11/1994 | Lammers et al. .............. | 242/338.1 |
| 5,433,397 | 7/1995 | Lalouette et al. .............. | 242/342 |
| 5,813,622 | 9/1998 | Von Alten .................... | 242/338.1 |

FOREIGN PATENT DOCUMENTS 62-066486  3/1987  Japan.
8-063940   3/1996  Japan.

*Primary Examiner*—John P. Darling
*Attorney, Agent, or Firm*—Birch, Stewart, Kolasch & Birch, LLP

[57] ABSTRACT

A single-reel tape cartridge includes a rectangular flattened casing including upper and lower panels joined together to define a reel chamber therebetween. A tape reel includes a cylindrical hollow boss and upper and lower flanges protruding radially outwardly from upper and lower ends of the hollow boss, respectively, and is accommodated rotatably within the reel chamber. A drive ring is disposed at a lower portion of a hollow of the hollow boss and adapted to receive a rotary drive from a drive element of a tape drive mechanism when the drive element is brought into engagement with the drive ring in a planar contact fashion. This drive ring is supported in a fashion slidable up and down, but non-rotatable relative to the hollow boss. A reel retainer is biased by a biasing spring in one direction towards the lower panel of the casing, such that the drive ring can be sandwiched between the drive element and the reel retainer while the drive element is held in tight contact with an undersurface of the drive ring.

2 Claims, 3 Drawing Sheets

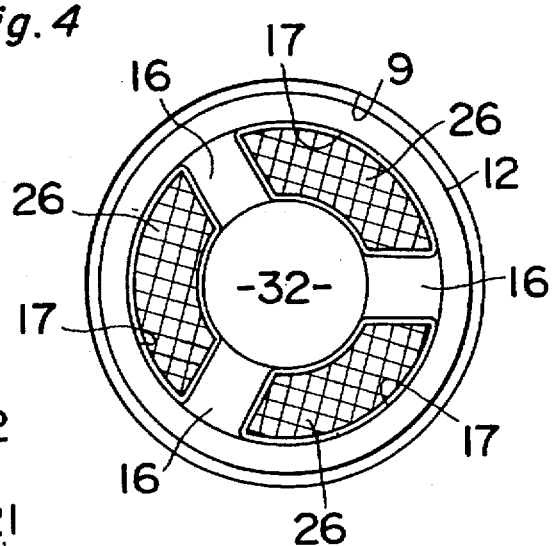
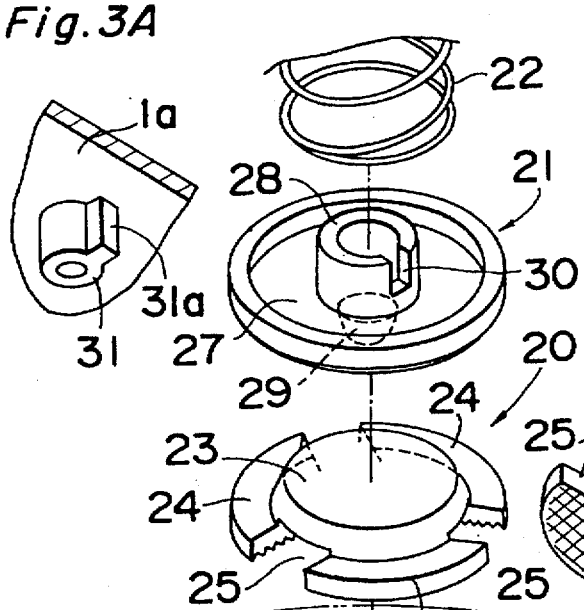
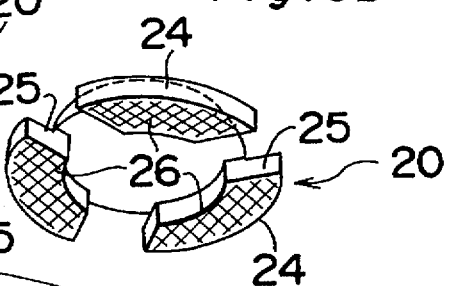
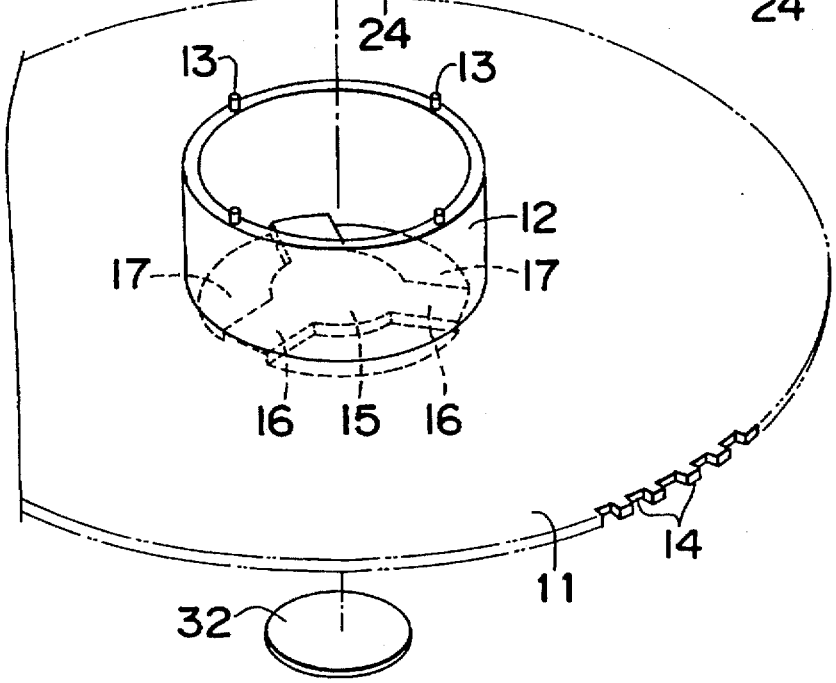

SINGLE-REEL TAPE CARTRIDGE

BACKGROUND OF THE INVENTION

1. (Field of the Invention)

The present invention generally relates to a magnetic tape cartridge and, more particular, to the magnetic tape cartridge of a type having a single tape reel for the support therearound of a length of magnetic recording and/or reproducing tape.

2. (Description of the Prior Art)

The single-reel tape cartridge, i.e., the tape cartridge of the type referred to hereinabove, is currently available in the market as an external storage module that is used in association with, for example, a computer. As disclosed in, for example, the Japanese Laid-open Patent Publications No. 62-66486 and No. 8-63940, the single-reel tape cartridge generally comprises a tape reel rotatably accommodated within a generally rectangular flattened box or casing. A length of magnetic recording tape is accommodated within the flattened box and is connected at one end to the tape reel and at the opposite end provided with a connecting piece that is utilized when the length of magnetic tape is to be drawn out of the flattened box.

More specifically, FIG. 7 illustrates the prior art single-reel tape cartridge believed to be pertinent to the present invention. As shown therein, the tape reel 53 used therein includes a cylindrical hollow boss 52 having opposite ends formed integrally with upper and lower radial flanges 50 and 51. The cylindrical hollow boss 52 is closed at one end by a perforated end wall and accommodates therein a reel retainer 54 movable between engaged and disengaged positions and cooperable with the perforated end wall to prevent the tape reel 53 from rotating idle when in the disengaged position, that is, so long as the tape cartridge is not in use. A ring-shaped iron plate 55 is secured to an outer surface of the perforated end wall of the hollow boss 52 in coaxial relation with the perforation in the end wall and is adapted to be magnetically coupled with a rotary drive element (not shown) of a tape drive externally to the tape cartridge. An annular portion of the outer surface of the perforated end wall radially outwardly of the ring-shaped iron plate 55 provides a surface engagement SE engageable with the rotary drive element to receive a rotational force from such rotary drive element. So far illustrated, the engagement 56 is in the form of a pattern of surface indentations.

The reel retainer 54 comprises a compression coil spring 57, a disc-shaped retainer plate 58 having a cylindrical hollow slide boss 59 and a passive pin 60 both formed integrally with the retainer plate 58 in coaxial relation thereto so as to extend outwardly therefrom in respective directions opposite to each other. While the compression coil spring 57 encircling the slide boss 59 applies a biasing force to the retainer plate 58 with a lower surface of retainer plate 58 held in contact with a raised seat 61 integral with the perforated end wall of the hollow boss 52, the passive pin 60 is engaged in the perforation in the perforated end wall of the hollow boss 52 and also in the perforation of the iron plate 55. Respective mating surfaces 62 of the retainer plate 58 and the raised seat 61 are indented in a sense reverse to each other so that they can be interlocked with each other unless the retainer plate 58 is displaced away from the raised seat 61.

A top panel of the flattened box has a guide post 63 formed integrally therewith so as to protrude into the hollow of the hollow boss 52 and relatively slidably projecting a distance into the hollow of the slide boss 59. Thus, the slide boss 59 normally urged by the spring 57 in one direction with the retainer plate 58 held in contact with the raised seat 61 can displace axially in the opposite direction against the spring 57, having been guided along the guide post 63 integral with the top panel of the flattened box.

Thus, unless the passive pin 60 is shifted upwardly against the spring 57 by the rotary drive element of the tape drive during the use of the tape cartridge to disengage the retainer plate 58 from the raised seat 61, the tape reel 53 cannot rotate idle about the longitudinal axis thereof. However, once the retainer plate 58 disengages from the raised seat 61 with the passive pin 60 shifted upwardly against the spring 57, the drive element of the tape drive is magnetically coupled with the iron plate 55 and, at the same time, engages the surface engagement 56 to thereby transmit the rotational force from the drive element to the tape reel 53 and, hence, to drive the tape reel 53 about the longitudinal axis thereof.

It has, however, been that the prior art single-reel tape cartridge of the structure discussed above have numerous problems. As discussed above, in order to set the tape reel 53 in a position ready to be driven, the passive pin 60 has to be pushed upwardly against the spring 57 to bring the reel retainer 54 to the disengaged position with the retainer plate 58 disengaged from the raised seat 61. Drive of the drive element can be transmitted to the tape reel 53 when and after the drive element is magnetically coupled with the iron plate 55 with the indented mating surfaces 62 engaged with each other. With this drive transmission system, it often occurs that the drive of the drive element cannot be assuredly transmitted to the tape reel 53 by the following reason.

Specifically, during the condition in which the reel retainer 54 is in the disengaged position with the retainer plate 58 disengaged from the raised seat 61 integral with the tape reel 53, the reel retainer 54 itself may tilt with a local area of the retainer plate 54 consequently held in contact with a corresponding portion of the raised seat 61, allowing either the drive element to be rotated idle relative to the tape reel 53 or the tape reel 53 itself to be rotated in a tilted fashion.

Since the drive element must bear a substantially entire quantity of the biasing force of the spring 57 transmitted thereto through the retainer plate 58 and the passive pin 60 when the reel retainer 54 is in the disengaged position, the tape reel 53 is susceptible to tilting. Also, since the drive element and the tape reel 53 are drivingly coupled with each other by means of the magnetic force of attraction developing between the drive element and the iron plate 55, there is no assurance that the entire quantity of the drive of the drive element can be transmitted to the tape reel 53 and, rather, the presence of a magnetic gap between the drive element and the iron plate 55 opens to the possibility of the tape reel 53 to tilt.

SUMMARY OF THE INVENTION

In view of the foregoing, an important object of the present invention is to provide an improved single-reel tape cartridge of an increased reliability, wherein the tape reel is drivingly coupled with the drive element of the tape drive mechanism by means of a generally planar engagement therebetween so that the tape reed can be rotated by the drive element.

In order to accomplish the above described object, the present invention provides a single-reel tape cartridge which comprises a generally rectangular flattened casing including upper and lower panels joined together to define a reel chamber therebetween. The lower panel has a drive access opening defined therein, and a tape reel including a cylindrical hollow boss having a lower end closed and an upper end opening upwardly, and upper and lower flanges protruding radially outwardly from the upper and lower ends of the hollow boss, respectively, is rotatably accommodated within the reel chamber. The tape reel has a length of tape wound around the hollow boss and positioned between the upper and lower flanges. A drive ring is disposed at a lower portion of a hollow of the hollow boss and adapted to receive a rotary drive from a drive element of a tape drive mechanism when the drive element is brought into engagement with the drive ring in a planar contact fashion. This drive ring is supported in a fashion slidable up and down, but non-rotatable relative to the hollow boss. A reel retainer is disposed between the upper panel of the casing and the drive ring, and a biasing spring is disposed between the reel retainer and the upper panel of the casing for biasing the drive ring in one direction towards the lower panel of the casing, such that the drive ring can be sandwiched between the drive element and the reel retainer while the drive element is held in tight contact with an undersurface of the drive ring.

Preferably, the lower end of the hollow boss is closed by a seat body having a plurality of arms extending radially outwardly therefrom to an inner peripheral surface of the hollow boss, in which case each neighboring arms define a window. The drive ring preferably includes a base resting on the seat body or the arms and has grooves defined therein in a number equal to the number of the arms for receiving therein the corresponding arms. This drive ring is fitted inside the hollow boss through the open upper end of the hollow boss. The seat body has an undersurface to which a magnetizable plate adapted to be magnetically attracted is secured.

BRIEF DESCRIPTION OF THE DRAWINGS

The present invention will become readily understood from the following description of preferred embodiments thereof made with reference to the accompanying drawings, in which like parts are designated by like reference numeral and in which:

FIG. 3A is an exploded view of the reel retainer mechanism used in the single-reel tape cartridge;

FIG. 3B is a perspective view showing a drive ring used in the tape cartridge as viewed from below;

FIG. 4 is a bottom plan view, as viewed in a direction shown by the arrow B in FIG. 1, of component parts of the reel retainer mechanism;

DETAILED DESCRIPTION OF THE EMBODIMENTS

Figure 1:
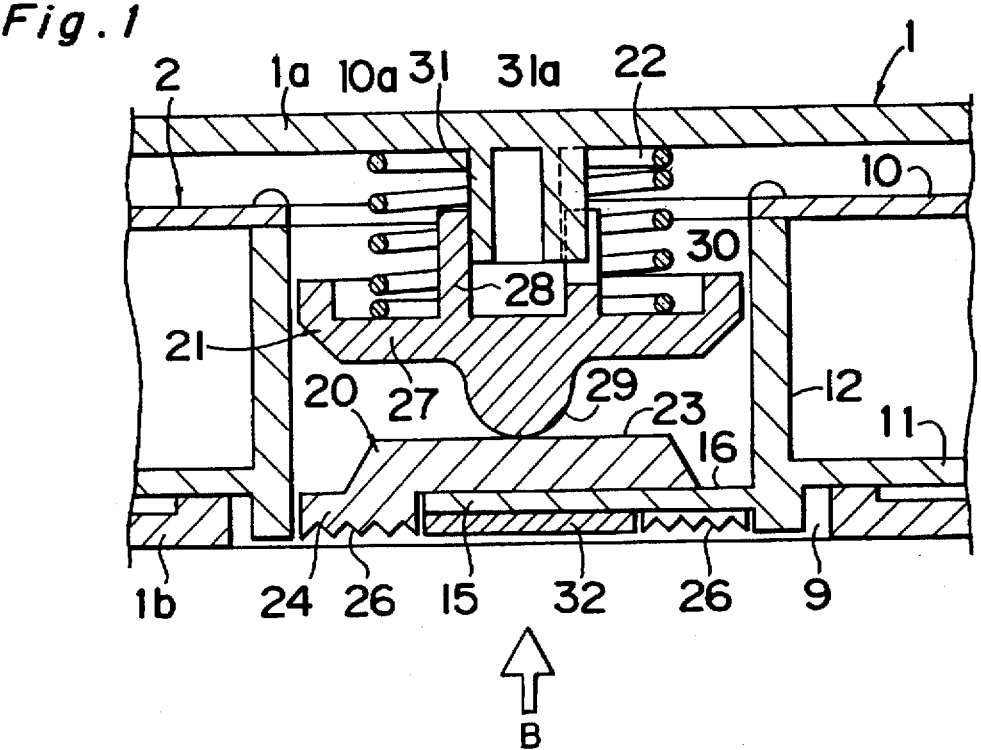
FIG. 1 is a fragmentary transverse cross-sectional view, taken along the line A—A in FIG. 2, showing a reel retainer mechanism used in a single-reel tape cartridge according to one preferred embodiment of the present invention.

Referring now to FIGS. 1 to 5, there is shown a single-reel tape cartridge having a reel retainer mechanism 21 according to one preferred embodiment of the present invention. The single-reel tape cartridge is in the form of a generally rectangular flattened box or casing 1 accommodating therein a single tape reel 2 and a length of magnetic recording tape 3 wound around the tape reel 2 with one end thereof anchored to the tape reel 2. The opposite end of the magnetic recording tape 3 has a connecting piece 4 secured thereto, which piece 4 is utilized when the length of magnetic recording tape 3 is to be drawn out of the flattened casing 1. This connecting piece 4 is disposed within the casing 1 at one of corner areas of the casing 1 adjacent a loading opening 5 through which the length of magnetic recording tape 3 is drawn out of the casing 1 and is retained in position by a pair of flexible retainer nails 6. The loading opening 5 is selectively opened and closed by a generally L-shaped hingedly supported lid 7.

The casing 1 comprises upper and lower panels 1a and 1b joined together with a peripheral wall intervening therebetween to thereby define a reel chamber in which the tape reel 2 is accommodated. As shown in FIG. 1, the casing 1 has a drive access opening 9 defined at a substantially center area of the lower panel 1b for the access of a drive element D (FIG. 5) of the tape drive (not shown) to the tape retainer mechanism 21 as will be described later.

Figure 2:
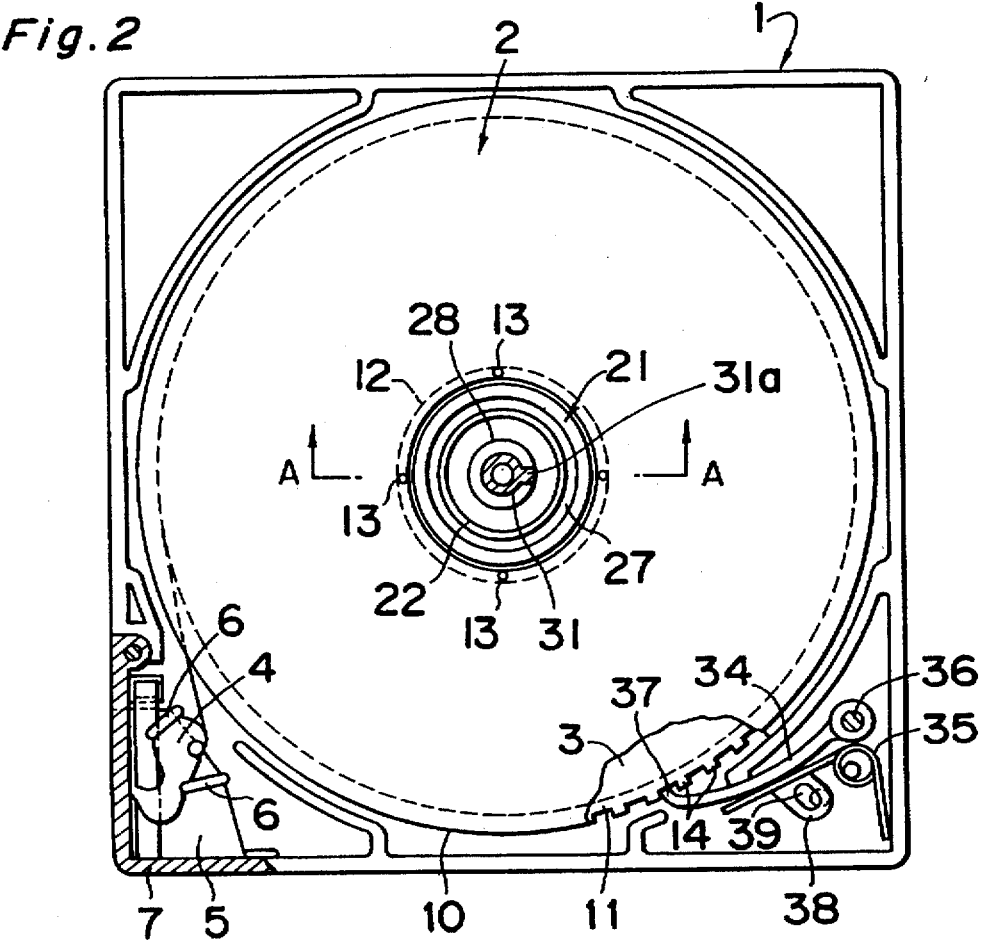
FIG. 2 is a top plan view of the single-reel tape cartridge with a top panel removed.

The tape reel 2 used therein includes a cylindrical hollow boss 12 having opposite ends formed with upper and lower radial flanges 10 and 11. While the lower radial flange 11 is formed integrally with the cylindrical hollow boss 12 so as to extend radially outwardly from a lower end of the hollow boss 12, the upper radial flange 10 having a center hole 10a defined therein is coaxially mounted on an upper annular end of the cylindrical hollow boss 12 with the center hole 10a aligned with the hollow boss 12 and is fusion-bonded therewith. For this purpose, an upper annular end face of the cylindrical hollow boss 12 has a plurality of, for example, four, positioning pins 13 formed integrally therewith so as to protrude outwardly as shown in FIG. 3A, which pins 13 are plugged into corresponding holes (not shown) in the upper radial flange 10 adjacent the center hole 10a with their tips fused to adhere to the upper radial flange 10. The lower radial flange 11 has its outer periphery formed with a series of gear teeth 14 cooperable with a lock pawl 34 as shown in FIG. 2 and which forms a part of a reel lock mechanism as will be described later.

A generally plate-like seat member including a disc-shaped seat body 15, a disc-shaped magnetizable plate 32 made of iron or steel and fixedly secured to an undersurface of the seat body 15, and a plurality of, for example, three, radial arms 16 protruding radially outwardly from the seat body 15 as best shown in FIG. 3A is positioned inside the hollow of the hollow boss 12 with the seat body 15 aligned with the longitudinal axis of the hollow boss 12. This seat member is disposed at the lower end of the hollow boss 12 with the radial arms 16 fixed to, or formed integrally with, the wall forming the hollow boss 12. As shown in FIG. 4, the radial arm 16 are spaced an equal distance from each other in a direction circumferentially of the seat body 15 with each neighboring radial arms 16 defining a generally sector-shaped windows 17.

For transmitting a rotational force of the drive element of the tape drive to the tape reel 2, a generally plate-like drive ring 20 is disposed within the hollow of the boss 12. The drive ring 20 includes, as best shown in FIGS. 3A and 3B, a disc-shaped base 23 adapted to rest on the seat body 15 and sector-shaped coupling plates 24 equal in number to the number of the windows 17 and similar in shape to the shape of the windows 17, which coupling plates 24 are formed integrally with the base 23 so as to protrude radially outwardly from the base 23. Each neighboring coupling plates 24 are spaced from each other by the presence of a corresponding groove 25 of a size sufficient to accommodate therein the corresponding arm 16 integral with the seat body 15. Respective surfaces of the coupling plates 24 facing downwardly are formed with a pattern of surface indentations 26 as best shown in FIG. 3B.

The drive ring 20 within the boss 12 is normally urged downwardly by a compression spring 22 positioned above the drive ring 20 with a reel retainer 21 intervening therebetween. The reel retainer 21 includes a generally dish-shaped spring seat 27, a cylindrical hollow slide boss 28 formed on an upper surface of the spring seat 27 in concentric relation therewith and protruding upwardly, and a spherically-tipped spindle 29 formed on a lower surface of the spring seat 27 in coaxial relation with the slide boss 28 so as to protrude downwardly and in a direction counter to the slide boss 28. The spring seat 27 has a maximum diameter slightly smaller than the inner diameter of the boss 12 so that the reel retainer 21 can move within the hollow of the boss 12 without an outer peripheral surface of the spring seat 27 being substantially interfered by the wall forming the boss 12.

The slide boss 28 has an axial cutout 30 defined therein so as to extend a distance axially inwardly from an open end thereof opposite to the spring seat 27. On the other hand, a portion of the upper panel 1a of the casing 1 is formed with a cylindrical guide post 31 formed integrally therewith so as to extend a distance towards the lower panel 1b of the casing in alignment with the hollow of the boss 12. This guide post 31 is integrally formed with an axial key 31a protruding radially outwardly therefrom and extending over the entire length of the guide post 31, said key 31a having a thickness substantially equal to or slightly smaller than the width of the cutout 30 in the slide boss 28. In an assembled condition as shown in FIG. 1, the guide post 31 protrudes into the hollow of the slide boss 28 with the key 31a engaged in the cutout 30 to thereby prevent the slide boss 28 and, hence, the reel retainer 21 from rotating about the longitudinal axis of the slide boss 28. Thus, the reel retainer 21 can move up and down in a direction perpendicular or substantially perpendicular to the base 23 of the drive ring 20 with the slide boss 28 axially guided by the guide post 31.

The compression spring 22 referred to hereinbefore is disposed around the slide boss 28 and interposed between the upper panel 1a of the casing 1 and the spring seat 27 and, accordingly, the reel retainer 21 is normally biased downwards with the spherical tip of the spindle 29 held in contact with the base 23 of the drive ring 20 as shown in FIG. 1.

The single-reel tape cartridge of the present invention can be assembled in a manner which will now be described briefly. Assuming that the upper panel 1a of the casing 1 has not yet been joined to the lower panel 1b thereof, the tape reel 2 is mounted into the casing 1 with the lower end of the hollow boss 12 received within the drive access opening 9 that is defined in the lower panel 1b. Subsequently, the drive ring 20, the reel retainer 21 and the compression spring 22 are successively inserted into the hollow of the boss 12 from above, followed by capping of the upper panel 1a onto the casing 1 with the guide post 31 inserted into the hollow of the slide boss 28. At the time the guide post 31 is inserted into the hollow of the slide boss 28, the guide post 31 must be so oriented as to permit the key 31a to be aligned with the cutout 30. Thereafter, the upper panel 1b is joined to the lower panel 1b through the peripheral wall.

In the assembled condition, the sector-shaped coupling plates 24 of the drive ring 20 are exposed to the outside through the corresponding windows 17 while the arms 16 integral with the seat body 15 are received in the respective grooves 25. Accordingly, the drive ring 20 is supported in position not rotatable relative to the hollow boss 12, but displaceable axially relative thereto.

When the tape cartridge of the present invention is not in use, the lower flange 11 of the tape reel 2 is frictionally engaged with the lower panel 1b of the casing 1 under the influence of a biasing force of the compression spring 22 which is transmitted thereto through the reel retainer 21, then through the drive ring 20 and finally through the seat member including the seat body 15 and the arms 16. Accordingly, due to the frictional engagement between the tape reel 2 and the lower panel 1b of the casing, an arbitrary rotation of the tape reel 2 within the casing 1 can be prevented more or less. However, if the tape cartridge of the present invention receives an external impact or shock as a result of, for example, the tape cartridge having fallen onto the ground surface or collided, the magnetic tape wound around the tape reel 2 may be loosened. To avoid this possibility assuredly, the tape cartridge embodying the present invention makes use of the reel lock mechanism which will now be described with particular reference to FIG. 2.

The reel lock mechanism includes the lock pawl 34 cooperable with any one of the gear teeth 14 in the lower flange 11 and a torsion spring 35 having a coiled portion with its opposite ends extending outwardly from the coiled portion, both of said lock pawl 34 and said torsion spring 35 being accommodated within one of the corner areas of the casing 1, for example, a front right corner area as viewed in FIG. 2, other than the corner area in which the connecting piece 4 is positioned. The lock pawl 34 is pivotable between engaged and disengaged positions about a pivot pin 36 rigid with one of the upper and lower panels, for example, the lower panel 1b, of the casing 1 and is normally urged towards the engaged position by the torsion spring 35 with its free end 37 engaged in one of the gear teeth 14 to thereby avoid an arbitrary rotation of the tape reel 2 in a direction required to draw the length of magnetic tape out of the casing 1, for example, counterclockwise as viewed therein.

The lock pawl 34 has a generally intermediate portion integrally formed with a release piece 38 extending laterally outwardly from an undersurface thereof and having a perforation 39 defined therein. While the free end 37 of the lock pawl 34 then biased clockwise as viewed in FIG. 2 to the engaged position by the torsion spring 35 is engaged in one of the gear teeth 14 to keep the tape reel 2 immovable within the casing 1, the lock pawl 34 can be moved towards the disengaged position against the torsion spring 35 when the user inserts a release pin (not shown) into the perforation 39 through a perforation, defined in the lower panel 1b of the casing, and then move the release pin in a direction required to displace the lock pawl 34 counterclockwise against the torsion spring 35.

Figure 5:
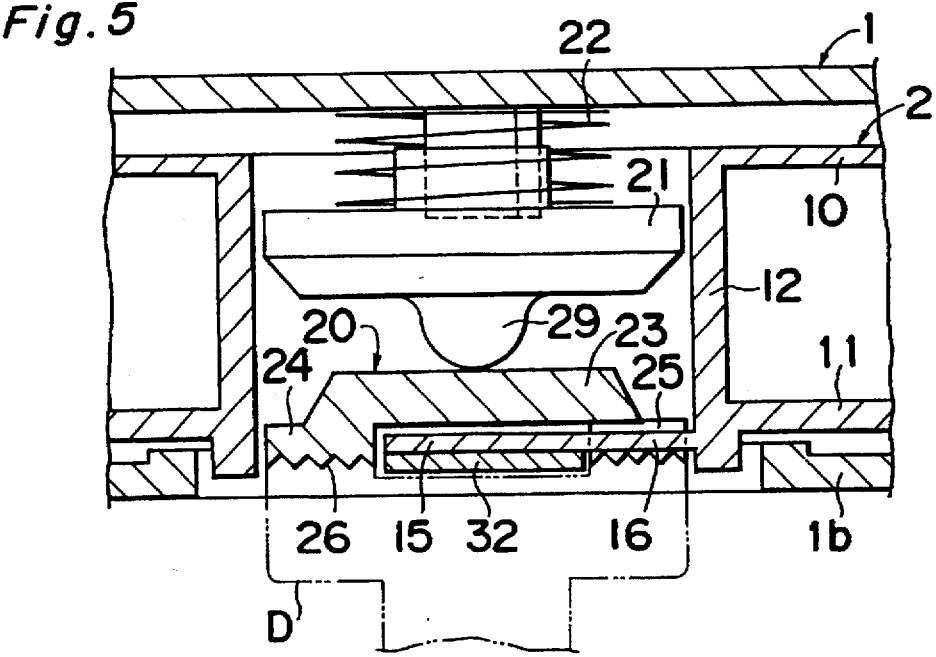
FIG. 5 is a view similar to FIG. 1, showing how a tape reel is driven.

FIG. 5 illustrates a condition in which the tape reel 2 is ready to be driven about its longitudinal axis. In this condition, the rotary drive element identified by the phantom line D is held in contact with the pattern of the surface indentations 26 of the coupling plate 24, the magnetizable plate 32 and the arms 16 in a fashion referred to as a planar contact drive transmission system and is hence coupled with the tape reel 2. Also, by the action of a coupling force transmitted from the drive element D to the tape reel 2, an inner peripheral portion of the lower flange 11 of the tape reel 2 adjacent the hollow boss 12 is floated, i.e., lifted upwardly from the lower panel 1b of the casing 1b and, at the same time, the drive ring 20 is slightly slid upwardly relative to the tape reel 2 with the base 23 consequently lifted upwardly from the seat body 15, thereby permitting the tape reel 2 ready to be driven by the drive element D.

Even in this condition as shown in FIG. 5, the biasing force of the spring 22 is transmitted to the drive ring 20 through the reel retainer mechanism 21 and, accordingly, the drive ring 20 is coupled with the drive element D under the force corresponding to the force with which the drive element D is upwardly shifted, so that the drive of the drive element D can assuredly be transmitted to the tape reel 2. Even if the tape reel 2 is displaced up and down and/or tilted under the influence of an external force such as an impact or shock, the drive ring 20 keeps tight contact with the drive element D to transmit the drive to the tape reel 2 to rotate the latter with no fault. It is to be noted that the drive of the tape reel 2 about the longitudinal axis thereof is to be understood as including an idle rotation of the drive element D that takes place at the time the length of magnetic tape 3 is to be drawn out of the tape reel 2.

In the foregoing embodiment of the present invention, the drive ring 20 has been described as mounted into the hollow of the hollow boss 12 through the upper open end thereof, the drive ring 20 can be mounted into the hollow of the hollow boss 12 through the lower open end thereof. In such case, the drive ring 20 should be of a design which will now be described with reference to FIG. 6.

Figure 6:
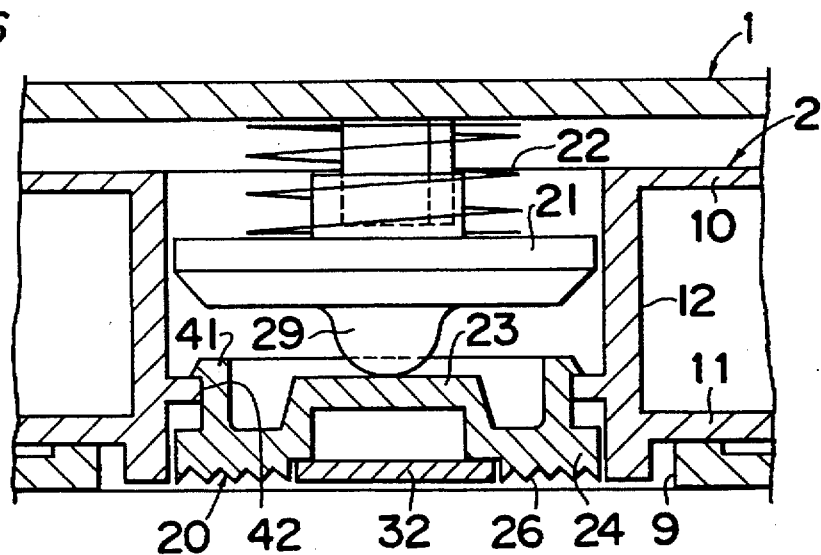
FIG. 6 is a view similar to FIG. 1, showing the reel retainer mechanism according to another preferred embodiment of the present invention.
Figure 7:
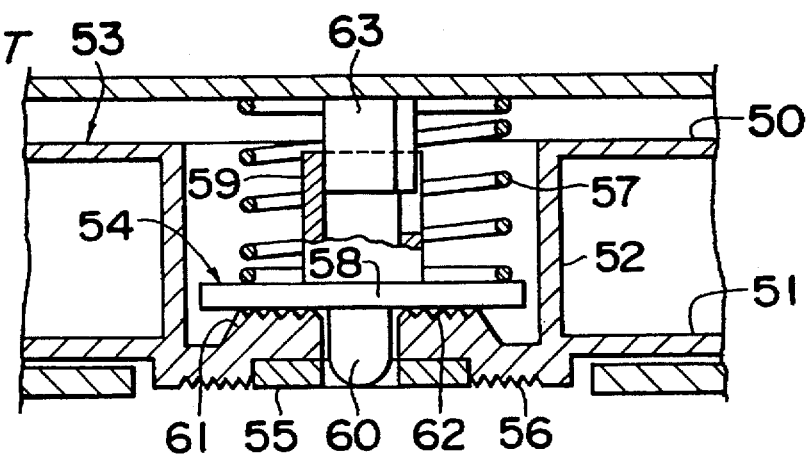
FIG. 7 is a fragmentary transverse cross-sectional view of that portion of the prior art single-reel tape cartridge.

As shown in FIG. 6, the drive ring 20 includes the coupling plate 24 of a ring shape and having an upper surface formed with a coupling boss 41 of a generally non-circular cross-section. The coupling boss 41 is press-fitted into a coupling hole 42 defined in a bottom of the hollow boss 12 of the tape reel 2 to integrate the drive ring 20 and the tape reel 2 together. In this design, the drive ring 20 can slide up and down relative to the coupling hole 42. The coupling boss 41 has an inner peripheral surface formed with a generally cylindrical base 23 on which the reel retainer mechanism 22 rests as biased by the spring 22.

As hereinabove fully described, the present invention is such that the use has been made of the drive ring 20 separate from the tape reel 2 so that the rotary drive of the drive element D can be transmitted to the tape reel 2 through the drive ring 20. Also, while the drive ring 20 is slidable up and down relative to the tape reel, the drive ring 20 is mounted in a non-rotatable fashion relative to the tape reel 2 and is operatively associated with the reel retainer mechanism 21 so that the biasing force of the spring 22 can be transmitted to the drive ring 20 at all times through the reel retainer mechanism 21. Accordingly, during the use of the tape cartridge of the present invention, the drive ring 20 can be tightly engaged with the drive element D to permit the rotary drive of the drive element D to be assuredly transmitted to the drive ring 20.

Also, since the drive ring 20 and the tape reel 2 can slide relative to each other, the rotary drive of the drive element D can be assuredly transmitted to the tape reel 2 even though the tape reel 2 undergoes an up and down or tilting motion and, accordingly, the reliability of the single-reel tape cartridge in which a planar contact drive transmission system is employed can be increased.

Although the present invention has been described in connection with the preferred embodiments thereof with reference to the accompanying drawings, it is to be noted that various changes and modifications are apparent to those skilled in the art. For example, although in any one of the foregoing embodiments of the present invention the hollow boss 12 has been shown as formed integrally with the lower flange 11, the present invention is not always limited thereto. Also, in place of the reel Rock mechanism, the undersurface of the lower flange 11 and an inner surface of the lower panel 1b of the casing 1 may be formed with mutually engageable surface indentations which can be engaged with each other to lock the tape reel 2 to thereby avoid an arbitrary motion and an idle run during the non-use of the tape cartridge.

Such changes and modifications are to be understood as included within the scope of the present invention as defined by the appended claims, unless they depart therefrom.

What is claimed is:

1. A single-reel tape cartridge which comprises:

a generally rectangular flattened casing including upper and lower panels joined together to define a reel chamber therebetween, said lower panel having a drive access opening defined therein;

a tape reel including a cylindrical hollow boss having a lower end closed and an upper end opening upwardly, and upper and lower flanges protruding radially outwardly from the upper and lower ends of the hollow boss, respectively, said tape reel having a length of tape wound around the hollow boss and positioned between the upper and lower flanges;

a drive ring disposed at a lower portion of a hollow of the hollow boss and adapted to receive a rotary drive from a drive element of a tape drive mechanism when the drive element is brought into engagement with the drive ring in a planar contact fashion, said drive ring being supported in a fashion slidable up and down, but non-rotatable relative to the hollow boss;

a reel retainer disposed between the upper panel of the casing and the drive ring; and a biasing spring disposed between the reel retainer and the upper panel of the casing for biasing the drive ring in one direction towards the lower panel of the casing, such that the drive ring can be sandwiched between the drive element and the reel retainer while the drive element is held in tight contact with an undersurface of the drive ring.

2. The single-reel tape cartridge as claimed in claim 1, wherein the lower end of the hollow boss is closed by a seat body having a plurality of arms extending radially outwardly therefrom to an inner peripheral surface of the hollow boss, each neighboring arm defining a window, wherein the drive ring includes a base resting on the seat body or the arms and has grooves defined therein in a number equal to the number of the arms for receiving therein the corresponding arms, said drive ring being fitted inside the hollow boss through the open upper end of the hollow boss, and wherein said seat body has an undersurface to which a magnetizable plate adapted to be magnetically attracted is secured.

* * * * *